United States Patent
Durst

[11] Patent Number: 5,839,197
[45] Date of Patent: Nov. 24, 1998

[54] CUTTER AND SEPARATOR UTENSIL

[76] Inventor: Larry T. Durst, 1139 Bunker Hill Rd., Troy, Ohio 45373

[21] Appl. No.: 885,776

[22] Filed: Jun. 30, 1997

[51] Int. Cl.[6] ....................................................... B26B 9/00
[52] U.S. Cl. .................................. 30/353; 30/324; 30/355
[58] Field of Search ............................ 30/322, 324–328, 30/346, 353, 355, 314, 114; D7/650, 653

[56] References Cited

U.S. PATENT DOCUMENTS

| | | | |
|---|---|---|---|
| D. 34,272 | 3/1901 | Hoffman | 30/353 X |
| D. 44,211 | 6/1913 | Lydick . | |
| D. 110,397 | 7/1938 | Morny . | |
| D. 166,880 | 5/1952 | Ruppe | 30/355 |
| D. 203,818 | 2/1966 | Seibew | D22/3 |
| D. 235,306 | 6/1975 | Christino et al. | D7/138 |
| 1,700,205 | 1/1929 | McCready . | |
| 2,938,267 | 5/1960 | Tupper | 30/142 |
| 3,121,951 | 2/1964 | Green | 30/149 |
| 5,014,434 | 5/1991 | Skerker et al. | 30/345 |

FOREIGN PATENT DOCUMENTS

| | | | |
|---|---|---|---|
| 207281 | 1/1960 | Austria . | |
| 158373 | of 1954 | Sweden | 69/18 |
| 198938 | 7/1938 | Switzerland | 30/353 |
| 251959 | 11/1947 | Switzerland | 30/355 |
| 2527 | of 1884 | United Kingdom . | |

*Primary Examiner*—Douglas D Watts
*Attorney, Agent, or Firm*—Ralph L. Marzocco

[57] ABSTRACT

A cutter and separator utensil is disclosed whereby means for cutting an article of food into portions are combined with means for separating from the walls of cookware portions of food adhering thereto. The utensil of this invention can be commercialized as a disposable and as a nondisposable article of manufacture fabricated from either metallic or nonmetallic materials that are food industry safe.

6 Claims, 1 Drawing Sheet

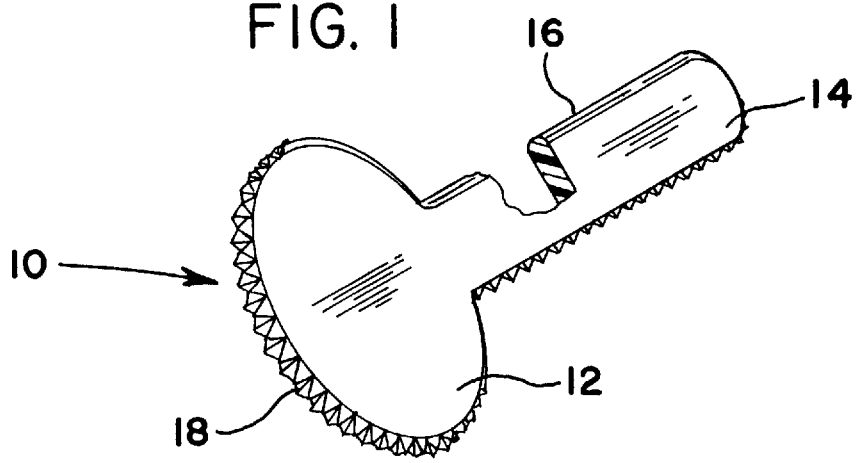
FIG. 1
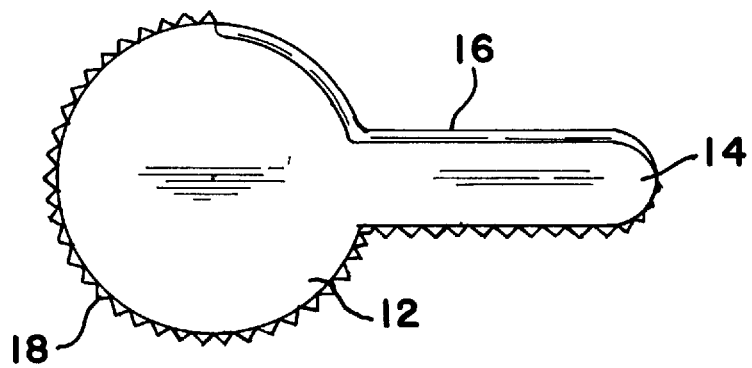
FIG. 2
FIG. 3

CUTTER AND SEPARATOR UTENSIL

BACKGROUND OF THE INVENTION

1. Field of the Invention

The present invention generally relates to a cutter and separator utensil for use in culinary art and science. More particularly, the invention relates to a cutter and separator utensil whereby means for cutting an article of food into portions are combined with means for separating portions adhering to walls of cookware therefrom.

2. Description of the Prior Art

Throughout the ages in domestic affairs womenkind have used culinary utensils such as knives, forks, spoons, saws, slicers, and servers in the preparation of meals. The prior art discloses culinary utensils of ornamental design and culinary utensils which combine the functions of a knife, fork, spoon, saw, slicer, and server in the design of a single device.

Disclosed in U.S. Design Pat. Nos. 44,211; 110,397; 203,818; and 235,306 are examples of culinary utensils of ornamental design. Disclosed in U.S. Pat. Nos. 1,700,205; and 2,938,267; Britain Pat No. 2,527; Sweden Patent No. 158,373; and Austria Patent No. 207,281 are examples of culinary utensils which combine two or more functions of a knife, fork, spoon, saw, slicer, and server in the design of a single device.

While many of the culinary utensils disclosed in the prior art generally have achieved the objectives for which they were designed, none disclose a design which embodies a combination of structural arrangements and features of the present invention. Consequently, the need still exists for a culinary utensil which combines the features of a cutter for cutting an article of food into portions and a separator for separating portions adhering to cookware walls from such walls.

SUMMARY OF THE INVENTION

The present invention is directed to providing a cutter and separator utensil capable of cutting into portions an article of food consisting of dough, baked with something on it, in it, or under it, such as flat bread, pizza pie, and fruit pie, and separating such cut portions of food from the walls of the baking vessel.

The cutter and separator utensil of the present invention discloses a substantially flat solid body that describes a generally racquet-shaped structure having a circular-shaped component integral with a rectangular-shaped component.

The primary advantage of the cutter and separator utensil of this invention is the integration of means for cutting an article of food into portions with means for separating cut portions adhering to walls of cookware from such walls. This and other advantages and attainments of the present invention will become apparent to those skilled in the art upon a reading of the detailed description of the invention when taken in conjunction with the drawings wherein there is shown and described an illustrative embodiment of the invention.

BRIEF DESCRIPTION OF THE DRAWINGS

For a further understanding of the nature and object of the invention, reference should be had to the detailed description of the exemplary embodiment taken in connection with the appended drawings in which:

FIG. 1 is a perspective view of a cutter and separator utensil of the present invention.

FIG. 2 is a top plan view of a cutter and separator utensil of the present invention.

FIG. 3 is a side elevational view of a cutter and separator utensil of the present invention.

In the following detailed description of the invention reference is made to the disclosed drawings.

DETAILED DESCRIPTION OF THE INVENTION

Referring to the drawings, and particularly to FIGS. 1 and 2, there is illustrated a cutter and separator utensil, generally designated 10, with means for cutting an article of food into portions and separating the cut portions sticking to walls of cookware therefrom.

Cutter and separator utensil 10 is a substantially flat device having a generally racquet-shaped configuration such as a tennis racquet or the like. Utensil 10 has an essentially circular component 12 integral with an essentially rectangular component 14.

A knife-like edge 16 circumscribes the entire periphery of utensil 10. A plurality of serrations 18 notch approximately three-fourths of knife-like edge 16 circumscribing the periphery of circular-shaped component 12 of utensil 10. And a plurality of serrations 18 notch approximately one-half of knife-like edge 16 circumscribing the periphery of rectangular-shaped component 14 of utensil 10.

As shown in FIG. 3, utensil 10 is not only substantially flat, it is also dimensionally thin when compared to its length or width dimension. Such dimensional thinness is advantageous inasmuch as it affords increased flexibility that enhances the utilitarian value of utensil 10. However, dimensional thinness of utensil 10 depends upon the strength of the material from whence it is fabricated, be it metal or nonmetal.

Utensil 10 can be commercialized as disposable and nondisposable articles of commerce manufactured from metallic and nonmetallic materials having properties approved for food useage. Examples of such metallic materials commonly used in the food industry are aluminum and steel, while examples of such nonmetallic materials used in the food industry are polystyrene and polytetrafluorethylene.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinabove described being merely an exemplary embodiment thereof.

What I claim is:

1. A food cutter and cookware separator utensil comprising:

a substantially flat tennis racquet-shaped utensil with a circular-shaped component integral with a rectangular-shaped component;

a knife like edge circumscribing the entire periphery of the utensil;

a plurality of serrations notching approximately three-fourths of the knife like edge circumscribing the periphery of the circular-shaped component of the utensil; and a plurality of serrations notching approximately one-half of the knife like edge circumscribing the periphery of the rectangular-shaped component of the utensil.

2. The cutter and separator utensil of claim 1, wherein said utensil is commercialized as disposable and nondisposable articles of manufacture.

3. The cutter and separator utensil of claim 1, wherein said utensil is manufactured from matallic materials having properties approved for food useage.

4. The cutter and separator utensil of claim 1, wherein said utensil is manufactured with metallic materials comprising aluminum and steel.

5. The cutter and separator utensil of claim 1, wherein said utensil is manufactured from nonmetallic materials having properties approved for food useage.

6. The cutter and separator utensil of claim 1, wherein said utensil is manufactured with nonmetallic materials comprising polystyrene and polytetrafluorethylene.

* * * * *